United States Patent [19]

Filloux

[11] 4,185,239
[45] Jan. 22, 1980

[54] SUPER SHARP AND STABLE, EXTREMELY LOW POWER AND MINIMAL SIZE OPTICAL NULL DETECTOR

[76] Inventor: Jean H. Filloux, 8402 Sugarman Dr., La Jolla, Calif. 92037

[21] Appl. No.: 856,791

[22] Filed: Dec. 2, 1977

Related U.S. Application Data

[63] Continuation-in-part of Ser. No. 646,274, Jan. 2, 1976, abandoned.

[51] Int. Cl.² ............... G01R 33/02; G01L 7/04; G01D 5/30
[52] U.S. Cl. ............... 324/259; 324/97; 250/230; 73/732
[58] Field of Search ............... 324/259, 97; 250/230; 318/640; 73/411

[56] References Cited

U.S. PATENT DOCUMENTS

| | | | |
|---|---|---|---|
| 2,151,627 | 3/1939 | Vacquier | 324/259 |
| 3,432,671 | 3/1969 | Edmonds | 250/230 |
| 3,508,142 | 4/1970 | Filloux | 324/259 |
| 3,535,538 | 10/1970 | Filloux | 250/230 |
| 3,888,362 | 6/1975 | Fletcher et al. | 318/640 |
| 3,994,588 | 11/1976 | Marx | 250/230 |
| 4,032,158 | 6/1977 | Stanwell | 250/230 |

*Primary Examiner*—Robert J. Corcoran

[57] ABSTRACT

An optical null detector design achieves exceptional efficiency of light utilization with a minimum of components providing (1) extremely sharp null recognition, (2) superior long term stability, (3) extremely low power requirement, and (4) minimal size and weight as well as several other desirable properties.

The device involves the use of an inherently directional light emitting pattern (DLEP) of optimized geometry, generating nearly all usable light and eliminating several components functionally necessary, though performance limiting in conventional devices. It is particularly suited, though not restricted, to measurement and control applications by means of feedback techniques when high resolution, large dynamic range, and space economy are required simultaneously with sustained effectiveness over long periods of time.

31 Claims, 22 Drawing Figures

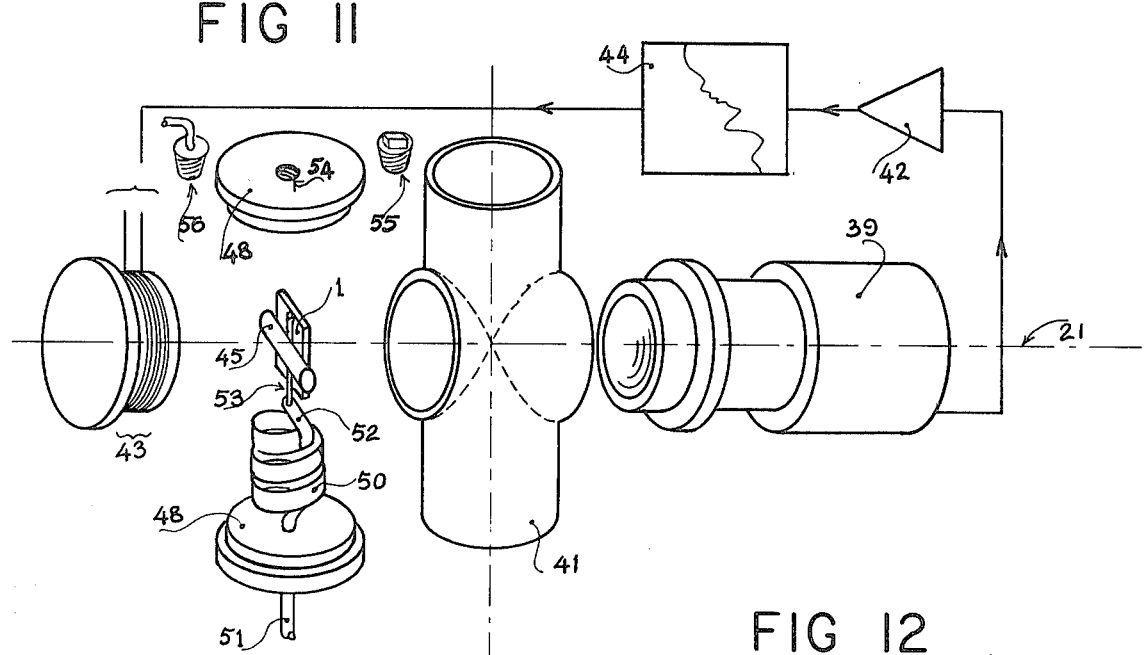
FIG 11
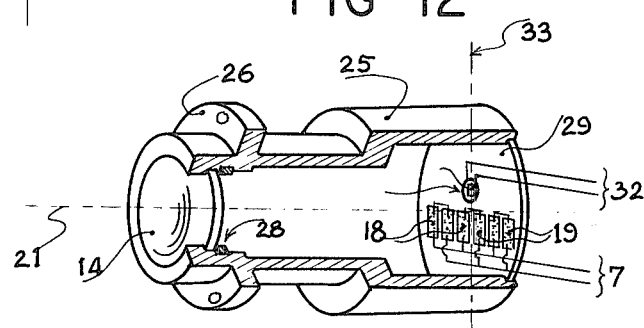
FIG 12
FIG 14
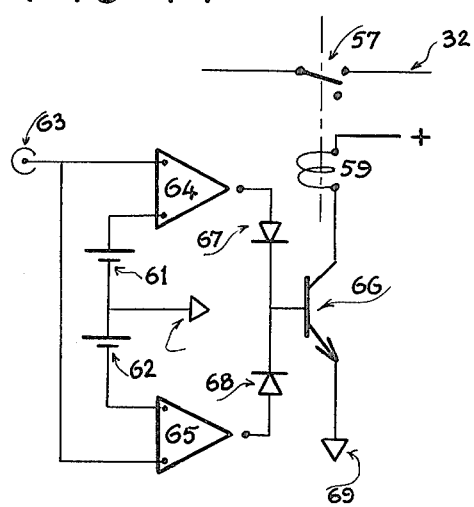
FIG 13
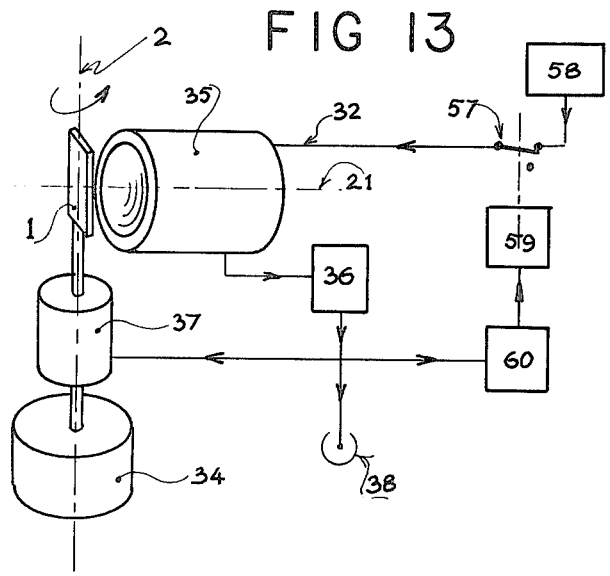

SUPER SHARP AND STABLE, EXTREMELY LOW POWER AND MINIMAL SIZE OPTICAL NULL DETECTOR

This is a continuation-in-part application referred to previous application Ser. No. 646,274, filed Jan. 2, 1976, now abandoned title "Super sharp and stable, extremely low power and minimal size optical null detector" from applicant Jean H. Filloux, 8402 Sugarman Drive, La Jolla, Ca., 92037.

This invention relates to an optical device capable of sharply detecting the direction of offset, away from a reference or null position, of a flat reflector rotating around an axis parallel to its surface. In conjunction with an appropriate feedback mechanism it permits high performance measurements and controls of a great variety.

Bouncing light off a mirror is a most effortless manner to transfer energy, and information, from one point to another. This was perceived in antiquity when Archimedes attempted to set the Roman fleet afire in the harbor of Syracuse by aiming and concentrating the light of the sun upon it by means of mirrors.

Transfer of scientific information by detecting the movements of a mirror through observation of the deflection of an intercepted light beam goes back to 1826 (Poggendorf, J. C., 1826, Ann. of Phys., Lpz., 7-121). Then Poggendorf realized that precise measurements of minute variations of the earth's magnetic field can be achieved by observing, against features on the horizon, the movements of the image of a distant object in a mirror attached to a magnet suspended on a fine wire.

The forces produced on a mirror intercepting light are due to radiation pressure, and, even in the case of intense illumination, these forces are exceedingly small (see any fundamental treatise in Electricity and Magnetism; Lebedew, P., 1901, Ann. of Phys., Lpz., 6, 433). Because of this tenuousness, the ratio of power transfer to the energy required to control it is enormous. It is thus understandable that implementations of the principle of deflecting light with a mirror for detecting or measuring movements otherwise imperceptible have played a considerable role in the development of experimental sciences and technology (Cavendish, H., 1798, Phil. Trans. Roy. Soc., 17, 469; Coulomb, C., 1785, Memoires de l'Adacemie des Sciences, 569; Boys, C. V., 1895, Phil. Trans. Roy. Soc., A, 1861; Ising, G., 1926, Phil. Mag., I, 837).

"Optical lever" is the most general term used to refer to instruments based on mirror deflection of light to measure rotation angles. It relates to the similarity of relationships between the arm lengths and arm displacements of both optical and mechanical levers. One fundamental property of both is the inherently proportional, or linear, relationship between angles, displacements and arm ratios.

A most popular optical lever, one constructed in greater number than any other is the lamp and scale attribute of classic bench galvanometers. In this instrument, by no means restricted to galvanometer usage, a reticle or back lighted pattern of single or multiple slits, with or without opaque geometric figures silhouetting upon a lighted patch, is reflected by a mirror and focused on a horizontal scale above the lighting and collimating system. Many configurations and sizes have been used. (Braddrok, H. J. J. and Blackett, P. M. S.; The Physics of Experimental Methods, John Wiley and Sons, 1954, 267).

Historical evolution of the optical lever and its applications has been reviewed in detail by Jones (Some developments and applications of the optical lever, R. V. Jones, J1, of Sci. Inst., Vol. 38, Feb. 1961).

The main breakthroughs following Poggendorf's are as follows: introduction in the light path of observation aids such as telescope (Weber, W., 1846, Fusst Jablonowskischen Gesellschaft, Lpz., 211; Werke, Vol. III, Part I, 27, Berlin: Springer 1893), use of sharp, artificially lighted patterns or reticles such as illuminated slits, silhoutted wire, finely ruled scales (Thompson, W. Lord Kelvin, 1867, British Assn. Report, Papers on Electrostatics and Magentism, 260, London, MacMillan, 1872), improvements of optics to the diffraction limit allowing long arms (50 meters), replacement of visual observation by precise instrumental detection of position by means of thermopiles in the 1920's (Wilson, W. H. and Epps, T. D., 1920, Proc. Phys. Soc., 32, 326; Mole, W. J. H. and Burger, H. C., 1925, Phil. Mag., 50, 626), by means of photoelectric cells in the 1930's (Recording optical lever, R. V. Jones, J. C. S. Richards, Jour. of Sci. Inst., Vol. 36, Feb. 1959. Also other earlier R. V. Jones references), these resulted in convenient electrical output instead of handwritten document, use of dense moiré patterns in place of slits, silhouetted patterns or reticles, resulting in greatly increased sensitivity, (Pfund, A. M., Resonance Radiometry, Sciences, 69, 71, 1929).

Broadly speaking, optical lever applications are of two classes: (1) the parameter of interest converted into mirror rotation by an appropriated transducer is estimated in function of the resulting beam deflection, for instance by measuring the position on a galvanometer scale of the image of the reference illuminated pattern with respect to its rest position (this technique may be broadly called an analog technique) and (2) the nulling method in which the mirror rotation induced initially is cancelled by superposition of a nulling effect of appropriate sign generated by an external measurable action the size of which scales the initial interaction to be measured; examples of this technique are the balancing of an electrical impedance bridge by nulling, on the lamp and scale system, the galvanometer signal from the bridge diagonal while adjusting an appropriate bridge component, or the measurement of a torque by cancelling it with a torsion balance and servomechanism, cancellation being established by an optical nulling system driving the servo (G. R. Heal, An improved control system for a vacuum balance, Jour. Sci. Inst., Vol. 43, 289, 1966; H. E. Blayden, A versatile electromagnetic balance, Jour. Sci. Inst. Vol. 43, 335, 1966).

The present invention relates to the second of these two types of optical lever applications, namely the optical nulling method.

Applications of the optical nulling method are extremely varied on account of (1) a multiplicity of options regarding the cancellation methods, and (2) considerable relaxation of the performances required from the optics in the analog method.

The two most stringent qualities desirable in an optical null system are (1) its sharpness or capability to detect the null position with extreme accuracy and (2) its stability or ability to always sense the null position exactly at the same place. The degree to which these quality criteria are met sets a limit to the precision that can be attained in experiments and techniques using the optical nulling method and to the variety of its applications. In addition to these two fundamental performance capabilities the following properties are also advantageous: (3) negligible sensitivity to temperature variations, (4) efficient power transfer ratio between light and light sensors so as to minimize power requirements, (5) compatibility with miniaturization and lightweight, (6) fast response, (7) simplicity and ruggedness, (8) modest cost.

The general objective of our invention is to provide an optical null detector with exceptional sharpness and stability.

Another object of the invention is to achieve these results simultaneously with extremely low power requirement, size and weight.

A further object of the invention is to provide the previous performance capabilities together with maximum immunity against temperature effects and with fast response, simplicity, sturdiness as well as at a modest cost.

Ultimately the versatility and usefulness of the invention is to be enhanced by assembling the basic constituents into a sturdy, single and modular optical null detector unit that can be readily integrated into more complex devices requiring a nulling device among other elements.

Other objects and the various advantages of the invention will become apparent to those skilled in the art from the following review, discussion and description taken in connection with the accompanying drawing where:

FIG. 2 is a similar view of an optical lever symmetric with respect to incident and reflected arms. (prior art)

FIG. 11 represents a Bourdon tube type pressure sensor using the optical null detector of the invention.

FIG. 12 is a perspective view showing an effective method of assembling the optical null detector components for cases in which a multiplicity of null positions is desired.

FIG. 13 illustrates one of the possible means by which a servomechanism using the multinull feature of the invention can be activated to switch from one null position to another when saturating.

FIG. 14 illustrates one of the possible means to implement the discrimination of approaching saturation and to induce switching.

Figures 1, 2A, 2B:
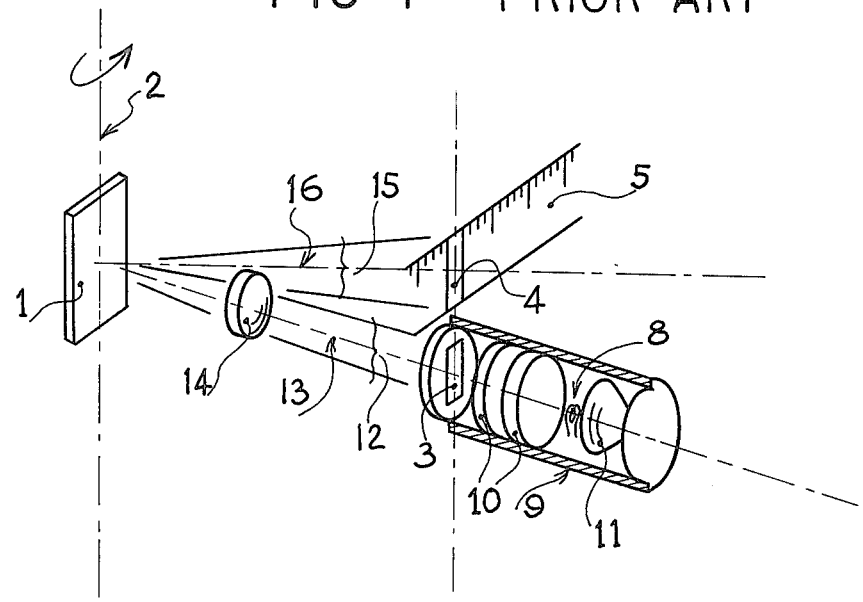
FIG. 1 is a perspective schematic view of the configuration of components in classic optical levers. (prior art)

FIGS. 1 and 2 refer to the most common optical lever and optical null detector configurations generally encountered. In both cases the rotations of a mirror 1 around an axis 2 parallel to its own plane result in displacements of the image 4 of a back lighted pattern or reticle 3 upon a reference element 5 such as a ruled scale in the case of a lamp and scale optical lever, or light sensors 6 in the case of optical null detector with electrical output 7. The light sensors 6 of FIG. 2b, properly shielded against ambient light, replace the ruled scale in FIG. 1 or 2a for electric output optical null systems. The back lighted pattern or reticle 3 is generally constituted by one or several slits or windows, with or without additional figures silhouetting upon the lighted opening such as grids or cross hairs. It is illuminated by a light source 8 and a light collimating assembly 9 which contains condensing lenses 10 and reflector 11. It produces an incident light beam 12 with axis 13, that crosses an objective 14 before intercepting the mirror 1. In the most general case of FIG. 1 the reflected light beam 15 with axis 16 forms an image 4 of the back lighted pattern 3 on the reference element 5 without crossing the objective 14. In the case of FIG. 2, on the contrary the reflected beam 15 crosses the objective 14 before forming the image 4 and both incident and reflected paths are symmetrical and equal.

Numerous and valuable advantages are gained by locating the objective in the near vicinity of the mirror and by using an incident to reflected arm ratio equal to unity (Strong, John et al., Procedures in Experimental Physics, Prentice Hall, 1938). Correct collimation then requires, according to elementary optics that the illuminated pattern 3 and its image 4 be located in the focal plane of the objective 14 (see any treatise on geometric optics). As a result, within the interval between mirror and objective, light rays are strictly parallel. The distance between active surface of mirror and optical center of objective is thus an invariant of the system and changes of positions of the mirror other than rotations do not displace the image and consequently cannot be misinterpreted for rotations.

The inherent decoupling of rotation signals from the translations in the layout of FIG. 2 is of great advantage in most sensitive systems for translations cannot be constrained without additional physical components such as bearings. Through friction the latter produce stick-slip hysteresis, thus deeply degrading sensitivity and linearity. The existence and adversity of natural translation modes of motion in all suspended mirror systems, for instance in classic galvanometers, torsion pendulii, torsion balances etc., is well known. Furthermore, the advantages and the necessity of translation decoupling obviously increase rapidly when the optical arms are shortened. For miniaturized instruments the configuration of FIG. 2 constitutes a substantial step toward high performances. These considerations are important in the present invention since ultimate performances are sought simultaneously with minimum size and low power.

In order to be able to discuss quantitatively the relevant performances of optical lever nulling methods we refer to FIG. 3. The image of a simple rectangular pattern 17 is shown in its centered or equilibrium position with respect to two light sensors 18 and 19, in FIG. 3a. The light sensors are connected to produce at the output wires 7 a signal equal to the difference between their individual outputs. Thus when the image falls entirely on the left sensor 18 the signal available at 7 is equal to $-KP$ where K is a scaling constant and P is the power in the light forming the entire image 17. The signal increases at some point when the image moves to the right and take the value $+KP$ beyond a certain point when it falls entirely on the right sensor 19.

Figure 3A:
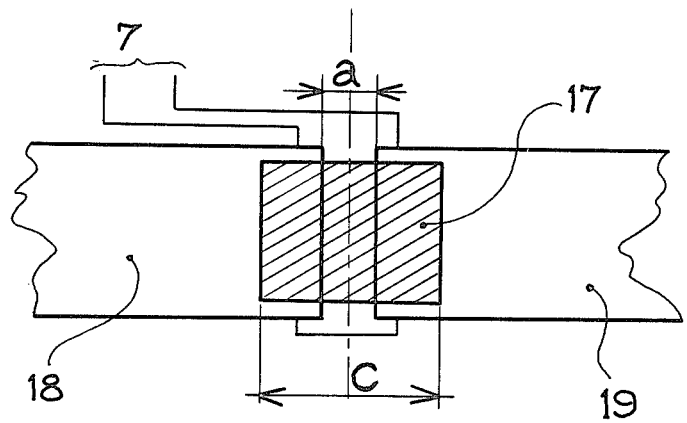
FIG. 3 is a diagram of an enlarged element of the image of an optical nulling device forming upon light sensors. The significant dimensional parameters are also indicated and the electrical output is plotted as a function of the position of the image with respect to the sensors.
Figure 3B:
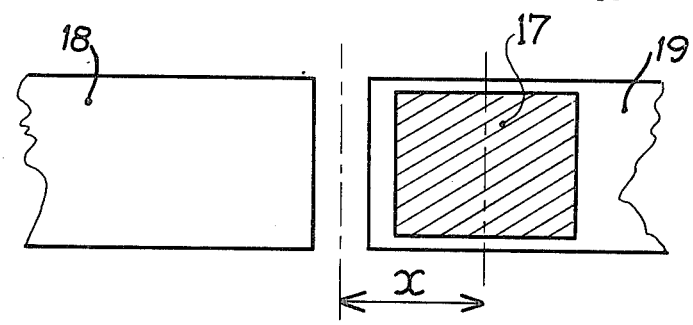
Figure 3C:
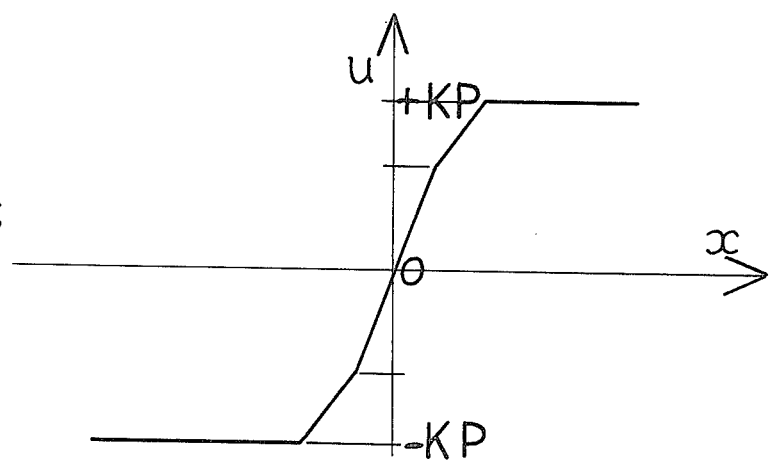
Figure 3D:
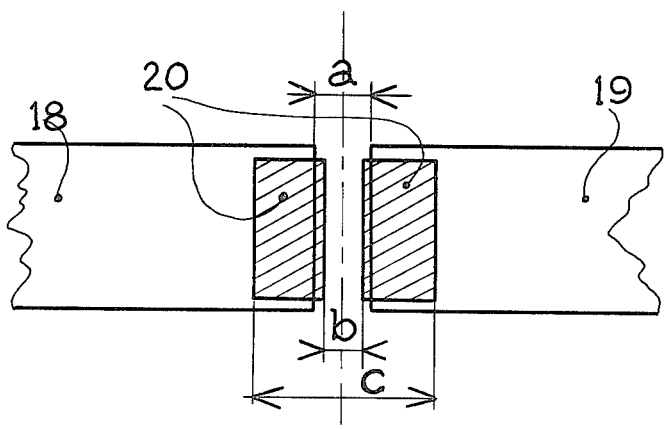

If we call a the separation between the light sensors 18 and 19, c the width of the lighted image 17, and x the distance between their axii, then the output of the differential sensors has the functional characteristics shown by the curve of FIG. 3c. This can be seen as follows: using the new proportionality constant $k=KP/x$ which refers to the contribution to the signal u per unit illuminated cell width, the dependance of u on x, that is the dependance of u on the mirror position, is as follows:

$$x \leq -\frac{(c+a)}{2} \quad u = -kc = -KP$$
$$-\frac{(c+a)}{2} < x < -\frac{(c-a)}{2} \quad u = k(x - \frac{c+a}{2}) = \frac{KP}{c}(x - \frac{c+a}{2})$$
$$-\frac{(c-a)}{2} < x < \frac{(c-a)}{2} \quad u = 2kx = 2KP\frac{x}{c}$$
$$\frac{(c-a)}{2} < x < \frac{(c+a)}{2} \quad u = k(x + \frac{c+a}{2}) = \frac{KP}{c}(x + \frac{c+a}{2})$$
$$\frac{c+a}{2} \leq x \quad u = +kc = +KP.$$

The highest sensitivity of the system is achieved when the output voltage u changes polarity at x=0 with the greatest slope. For a given power P in the lighted pattern this is achieved when KP/c is maximized, a situation that requires minimizing c.

Since it is advantageous to keep the linear region as wide as possible the two half slope segments in the intervals $(c-a)/2 < x < (c+a)/2$ should be as small as possible, which requires minimizing a.

Finally the ratio of the useful light in the lighted pattern to the total light is $(c-a)/c$.

Therefore, for a constant light power P in the simple rectangular illuminated pattern considered here, the highest sensitivity is achieved when (1) the dimension a, or light sensor dead spacing is minimized, (2) the image width c also is minimized, but (3) their minimization is made in a way that maximizes the ratio c/a. There is, therefore, a conflict which limits the reduction of c in function of the achievable reduction of a. This conflict results from the simplicity of the image used in the case of FIG. 3. It can be lifted up entirely, however, with the use of an appropriately shaped lighted pattern or reticle as seen later.

Stability performances can be investigated as follows. Assuming the system housing perfectly stable, instabilities in the achieved null position can still result from (1) temporal instabilities in the illumination uniformity associated with the light source and due to statistical fluctuations of photon emissions, air convection, and (2) to statistical fluctuations in the flow of charge carriers within the light sensors. These "noises" are best described in terms of the power spectrum or average power variations in the resulting output of the light sensors at various frequencies. The resulting output fluctuations $\Delta u$ in the signal u will cause fluctuations of the null position sensed by the null detector equal to $$\Delta x(\omega) = \frac{c-a}{2} \frac{\Delta u}{u}(\omega) \text{ with } \frac{\Delta u}{u}$$

dependent on the frequency $\omega$. The characteristics of $\Delta u/u(\omega)$ for both light sources and light sensors are inherent properties that cannot be optimized beyond certain limits set by the laws of physics. Thus stability is substantially dependent on geometry as shown by the relation formerly derived (see equation above).

With a, chosen as small as possible in a given situation, as required for sensitivity reason, we find that the uncertainty on the null position is linear with c. The stability therefore increases inversely with c. In other words there is a considerable advantage not only with respect to sensitivity but also with respect to stability, in concentrating the available light in a strip as narrow as possible, or in a more complex pattern of several narrow lines when the aforementioned restriction brought about by the finite separation c of the light sensors has to overcome. In such applications where the dimension c is limiting, the difficulty can be overcome as follows: the inactive center of the lighted pattern whose image at equilibrium covers the space a between light sensors can be eliminated and the corresponding light can be redistributed on the active sides (see FIG. 3d). In this case, the new optimum light pattern is made of two narrow stripes 20 separated by the distance b. It can be easily seen that, in order to insure maximum slope of the new curve of FIG. 3c at x=0, or null position, the space b between the two parts of the illuminated pattern should be a little smaller than the light sensor separation a.

The preceding discussion stresses the important facts that (1) sensitivity and stability become geometric properties independent of the characteristics of the light emitters and of the light sensors in the limit when the light pattern elements become infinitely narrow and (2) light patterns so constituted are prerequisites to maximum utilization of the light energy contained in the incident beam, hence are conditions necessary, though not sufficient to minimize power consumption.

Conventional lighting and light collimating systems using incandescent lamps, condensing lenses and reflectors are very poorly adapted to the production of lighted patterns made of narrow elements so as to produce the optimum geometry described above, because they involve considerable and unavoidable losses of light. This is so (1) because in these systems light is radiated in all directions, mostly useless, while only a small part of the light not properly directed can be collected back by reflectors, (2) because further losses occur due to reflection, diffusion and absorption through several, rather thick components, and ultimately (3) because the geometry of the lighted pattern is achieved by intercepting without recovering most of the light properly collimated: since for consistency with high sensitivity and stability the lighted pattern must be made of very narrow geometric figures the ratio of the light transmitted through the reticle to that illuminating it is extremely small. There is no simple alternative to this fact, in conventional systems, although some light efficiency can be gained at the price of a higher complexity and size of the light source and light collimating assembly.

Another substantial limiting factor in the lighting and light collimating systems of conventional optical levers or null detectors is that they occupy substantial space. This drawback is particularly unfortunate in miniaturiazed systems since this space lies beyond the length of the optical arm (see FIG. 1 and 2) thus increasing the instrument size considerably and without fundamental necessity. For example, in a small null optical detector having 5 cm arms, the actual size of the instrument may thus be more than doubled (see also R. V. Jones, earlier referenced).

The most distinctive particularity of our invention is that it uses a lighted pattern entirely formed and contained within the very near vicinity of where it is needed, namely the focal plane of the objective, that it radiates its light principally and inherently in the correct direction, that of the mirror, and that it emits light strictly over the geometry required for optimum performances as discussed earlier, excluding radiation from any other unnecessary areas.

Figure 4:
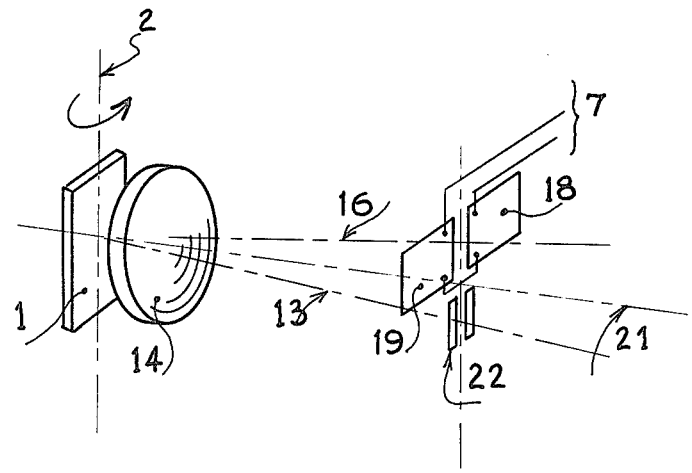
FIG. 4 is a schematic perspective view of an optical null detector constructed in accordance with the invention.

The optical null detector of our invention is illustrated schematically in FIG. 4. As any conventional optical null detector, it is located in front of a mirror 1, rotating around an axis 2 parallel to its surface. An objective 14 is located in front of the mirror, its optical axis 21 perpendicular to the mirror. The incident arm and the reflected arm are equal and, consequently, both the directional light emitting pattern 22 and the light sensors 18 and 19 are located in or very near the focal plane of the objective 14. The light sensors 18 and 19 are electrical devices that transform into electrical signals the light energy that they intercept. They are connected so as to produce a signal available at the leads 7, equal to the difference of their individual outputs, as discussed with respect to FIG. 3. Such sensors can be of a great variety. Among the most effective at present are the silicone photo sensors, often called solar cells. In the design of FIG. 4 the photo sensors 18 and 19 have a small though non negligible inactive space of width a between them as shown enlarged on FIG. 3. The DLEP (abreviation for Directional Light Emitting Pattern is used for simplification) is thus preferably made of two narrow dots or lines with a space b between them, with b slightly less than a (as concluded when discussing FIG. 3d). It is to be noticed that no component other than objective, light sensors and DLEP are used except for the mirror, needed in all cases, and the mechanical members, not shown here, holding them. In particular there are no condensors, reflectors, etc., and no active component extends beyond the optical arm length. This is so because of the particular properties of the DLEP stressed earlier. The manner in which the DLEP can be produced are examined in the following.

A directional light emitting pattern can be made of many relatively recently developed materials, capable, when properly excited, of emitting light in a strongly anisotropic directional pattern with maximum radiation in a direction perpendicular to their surface. Presently available are lasing diodes, light emitting diodes, liquid crystals, phosphorescent, luminiscent, and fluorescent coatings, infrared emitters made of miniature metal ribbons backed by an insulating plate and slightly heated by an electric current, and others.

Because of the great variety of light emitting diodes (LED) on the market, either in the visible or in the infrared region of the light spectrum, an adequate DLEP can be constituted by standard products directly available, though not originally designed for this specific purpose. Special LED configurations optimized for exceptional performance in our application can also be made on special order at an acceptable cost. We have used DLEP constituted of either single or arrays of light emitting diodes. Such devices are adequately flat, semi conductor junctions, thin by nature, with miniature supports which do not protrude appreciably behind the focal plane of the objective 14, then which do not contribute to increase the instrument size appreciably beyond the minimal one defined by the selected optical arm length.

Figure 5:
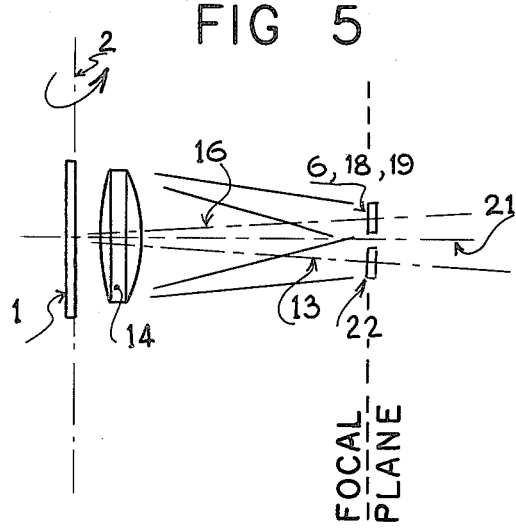
FIG. 5 is a schematic cross section stressing the geometric configuration of the various components of the optical null detector of the invention.

FIG. 5 shows a cross section of the optical null detector of our invention which makes apparent the importance, in this design, of a good directionality of the DLEP. Typically a LED transmits half of its light power within a solid angle 10° from its axis. A mirror relatively large is necessary to receive it, larger than necessary with a conventional light, condensor and reflector system. This may be seen as a possible disadvantage of our system compared to the conventional design of FIG. 1 or 2. The acceptability of a mirror of smaller size in these designs results from the collimating function of the condensing lenses that pinch the light rays at their exit, to form an image of the light source onto the mirror. This function is omitted in our design. Nevertheless the efficiency of utilization of the light, of the order of 50% in the system of FIG. 5 against a few percent at the very best for a conventional system, represents a considerable advantage of our design over former ones, and, in some way may justify, in case of necessity, the use of a smaller mirror, wastingmore light than otherwise necessary. Furthermore, a large mirror is required to limit diffraction and to allow formation of the sharp image desired when high resolution and stability are at stake. Thus the requirement for a larger mirror, in fact is limiting only on rare occasions. In such cases directionality enhancement can be used.

Figure 6:
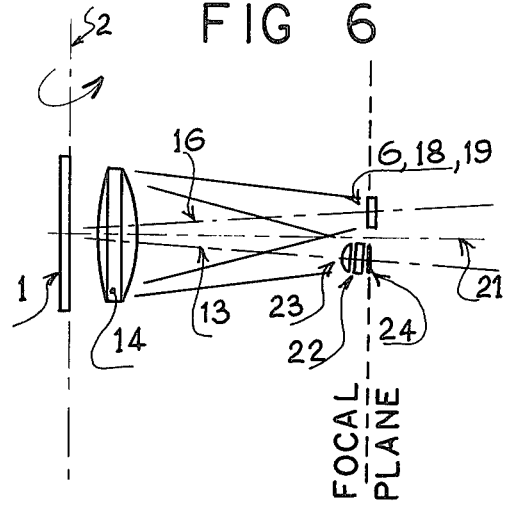
FIG. 6 is a view similar to that of FIG. 5 but using light directionality enhancement by means of small contact lenses on the light emitting pattern.

In cases where ultimate power efficiency is sought, so as to minimize the drain on batteries in remote installation for instance, or when reduction of the size of the mirror is advantageous, the directionality of the DLEP can be enhanced by juxtaposing in front of the light emitting elements of the LED thin and small spherical or cylindrical contact lenses 23 (see FIG. 6). Light utilization efficiency can thus be improved further, to the vicinity of 80% and possibly better. Because these lenses are very thin and are located on the side of the objective 14, there is no loss of space and no increase in size. The only necessity is to take into account the influence of the directionality enhancement contact lenses 23 on the image formed upon the light sensors 18 and 19 of the light emitting pattern 22 of the LED 22. In other words the actual geometry of the DLEP differs slightly from the emitting pattern of the LED. In order that its position 24 lies correctly in the focal plane of the objective, the LED must be located slightly forward of the focal plane. This is so because the actual DLEP is now constituted by the virtual image 24 of the emitting surface of the LED 22 with respect to the contact lens, the emitting surface being located between the optical center of the lens and the focal point, much closer to the former (see any geometry optics treatise). As obvious when comparing FIG. 6 with FIG. 5, directionality enhancement does not result in significant alteration of the geometry of the basic system, there is no change in size and the only change in behavior relates to a more efficient use of light.

Figure 7:
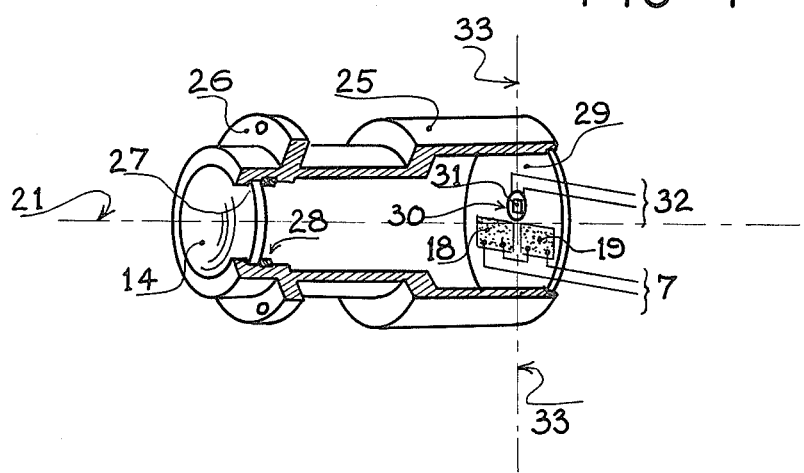
FIG. 7 is a perspective view of an effective method of implementing the invention into an integrated optical null detector module readily adaptable to variety of devices.

FIG. 7 represents the general assembly of an optical null detector constructed according to the peculiarities of our invention, showing a practical way to structurally support the active components. The housing 25 is conveniently made of a rigid tubular shape with mounting flange 26. The objective 14 is fastened at one end into a recessed area 27 by a threaded ring 28. A thin and flat disc 29 of rigid material normal to the axis of the tube 21 is fastened at the other end. The light sensors 18 and 19 are attached to one-half of the disc with an appropriate non conducting bounding agent and connected in opposition to produce a differential signal in the output wires 7. The directional light emitting pattern 22, for simplicity here, a single light emitting diode 30, emitting light over a very small square area 31 is mounted on the other diameter of the end disc 29, adjacent to the gap between light sensors. Current is fed into it through the leads 32.

When located in front of a flat mirror normal to the tube axis, capable of rotating around an axis parallel to both mirror and axis of symmetry 33 of the system DLEP and light sensors, this device produces in the leads 7 an output of one polarity when the mirror departs even only slightly from perfect normality with respect to the axis 21 and changing rapidly polarity when rotating, across perfect alignment, to the other direction.

The remarkable characteristics of this device, when optimized according to earlier guidance and discussions, out-perform the capabilities of other devices used for the same purpose but designed differently, this with respect to sensitivity, stability, size, weight, simplicity and at considerably reduced power drain.

As seen earlier this result has been achieved by replacing a bulky ensemble of components, namely light source, condensing lenses, reflector and reticle, by a single unit of very small dimension cumulating the functions of these components. This thin unit generates alone an incident beam properly aimed at the mirror, containing essentially all the emitted light. It is shaped initially, without further light truncation into the optimum pattern required. Thus its superior power economy.

Very generally the optical null detector of our invention is intended to be used in feedback mechanisms, systems or instruments to measure, monitor or control a parameter which, by means of an appropriate mechanism, causes a related rotation of a flat mirror. This functional relationship is described in FIG. 8. A mirror 1 attached to a sensor or transducer 34 rotates around the axis 2 when the physical parameter sensed by 34 changes. The optical null detector 35 is located in front of the mirror 1. If the position of the mirror changes, due to a change in the parameter measured, monitored or controlled, 35 produces a signal of a polarity indicative of the direction of rotation of the mirror away from the reference position. This signal is used by the servomechanism driver 36 to produce an action on the servomechanism 37 that acts upon the mirror to return it to the reference position. The size of the action required is thus a measure of the size of the parameter having caused the initial mirror rotation. Since the action can often be produced electrically, directly or indirectly, the resulting electric feedback signal 38 represents a convenient estimate of the measured or monitored parameter. This signal can be easily utilized or processed by means of other equipment such as chart recorder, digital meter, transmission circuits etc..

The optical null detector of the invention can thus be used in a great variety of applications. Its usability and effectiveness were demonstrated in two prototypes, namely a pressure gauge and a single component recording magnetic variograph.

Figure 9:
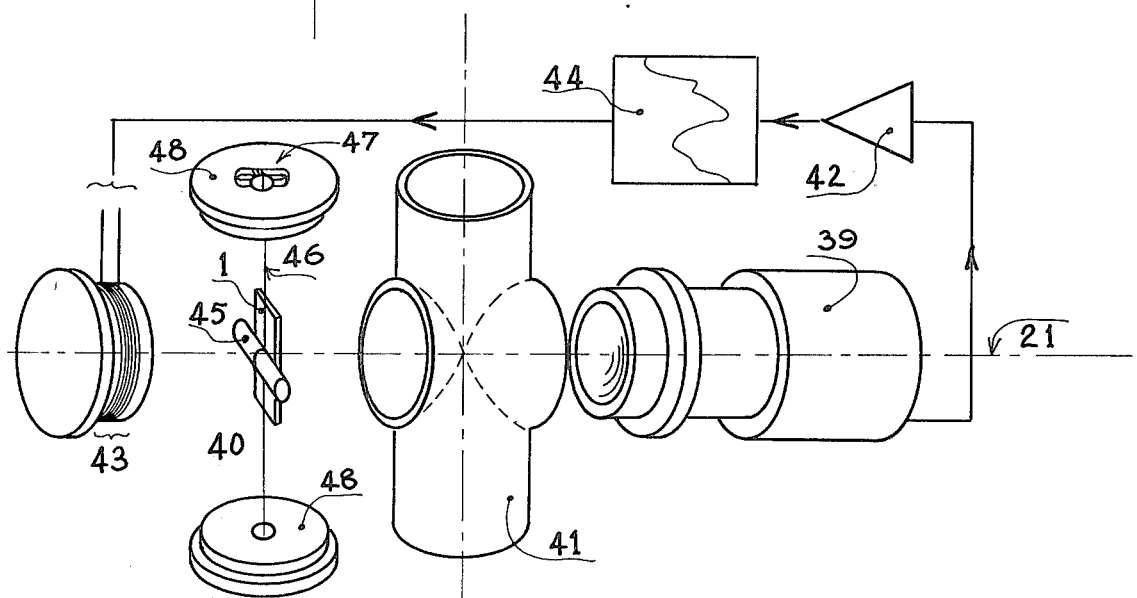
FIG. 9 represents a single component magnetometer using the optical null detector of the invention.

The basic magnetic variograph is shown on the semi-exploded view of FIG. 9. An optical null detector assembly 39 similar to that shown on FIG. 7 is used with the following characteristics: diameter 4 cm, optical arms 6 cm, overall length 7 cm, weight 60 grams. The optical null detector performs satisfactorily on a power as low as one-half of one milliwatt and with reduced, though useful, capabilities down to one-tenth of one milliwatt.

In addition to the optical null detector, the magnetic variograph includes a magnetic suspension 40, shown out of the housing 41 on FIG. 9, an amplifier 42 producing a feedback action by sending an electric current in the coil 43, a recorder 44 plotting the feedback signal with time and a power supply for the optical null detector, the amplifier and the recorder, not shown.

The magnetic suspension 41 is made of a small bar magnet 45 suspended on a fine tungsten wire 46, taut between spring 47, supported by the upper and lower end caps 48 of the housing 41. A mirror 1 with its plane parallel to both wire and magnet axis is attached to the magnet.

If a magnetic field is applied to the magnet in a direction normal to its direction and also normal to the wire, that is in a direction parallel to the null detector axis 21, a torque results that rotates magnet 45 and mirror 1. The mirror rotation is detected by the optical null detector 39 which, in turn, produces a signal indicative of this rotation. This signal is fed into the amplifier 42, resulting in a current in the coil that produces a magnetic field opposed to the one applied, thus tending to return the mirror toward its initial position. The action grows until it compensates exactly for the applied field. Then it stops and remains at that level as the mirror returns to the reference position. The current in the coil is thus proportional to the applied field. This current is plotted by the chart recorder. The resulting graph thus represents magnetic variations normal to the mirror.

The magnetic variograph described on FIG. 9 can be constructed with the following overall dimensions: length 14 cm, width 6 cm and height 12 cm, excluding the recorder whose size may change depending on applications. The suspension can be made of 0.1 mm tungsten wire, 10 cm long, supporting a magnet 3 mm in diameter and 20 mm long, and a circular mirror 15 mm in diameter. The housing must be non magnetic. Aluminum is an adequate material for this purpose. A convenient sturdy support is necessary to hold and keep the ensemble oriented in such a way that the axis of the optical null detector remains steadily aligned along the direction of the magnetic field component to be measured or monitored. Power supply, recorder or data logger, since connected by wires, can be located at any place. P From the previous description it is clear that the servomechanism action increases proportionally with the offset that the image of the lighted pattern would have with respect to its reference or null position if no feedback were applied. In instruments that cannot be easily adjusted so as to have their optical null detector well centered at the start of the operation, therefore that might produce from the beginning an output with a large initial offset, it is possible to modify the light sensors arrangement so as to provide a choice of alternate null positions.

Figure 10:
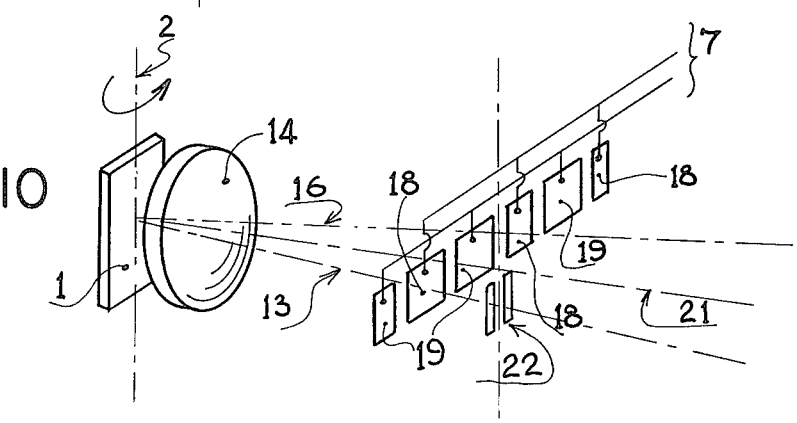
FIG. 10 represents an arrangement of light sensors allowing several possible nulling positions so as to reduce the initial nulling action required from the servomechanism.

FIG. 10 shows a modification of the light sensors configuration of FIG. 4 that provides for more than one reference or null positions. When started the system evolves until it reaches and locks on the nearest null position. Subsequently it remains locked to that one as long as the feedback loop remains closed. It is possible, however, should the feedback action reach saturation or a nonlinear level deteriorating the performances or making the system altogether inoperative, that a temporary suppression of the feedback action be commanded manually or automatically by an overload system. When activated by an operator or by an excessive feedback sensing scheme, the temporary suppression of feedback action then allows, at its resumption, the selection of an alternate null position more appropriate at that time.

The scheme described above should not be confused with a multiple equally spaced null system already patented by the applicant (see U.S. Pat Nos. 3,538772, 3,508,142, and 3,535,538). In the previously patented multinull system the measure of the parameter to be estimated is obtained by adding a most significant quantity, made of a number of equal increments corresponding to the number of jumps associated with the successive nulls assumed by the system multiplied by a calibration or instrumental constant, to a least significant quantity that represents a fractional surplus proportional to the feedback action. This scheme is well adapted to high resolution within one cycle and also to a large dynamic range. It is however critically sensitive to imperfections in the uniformity of spacing of a multiplicity of densely distributed nulls because the latter must be rigorously equally spaced to insure proper behavior. Practice with such systems has indicated that this goal is extremely hard to achieve. In the system described in the present application this limitation is avoided. High resolution and stability as well as large dynamic range result from the superior sharpness and fixity in time of the assumed null position and not from the fine splitting of the measured parameter into a large number of calibrated units, even if several reference positions are available. This is so because full exploitation of the high performances of modern electronic devices such as analog to digital to analog converters are not limited or degraded by incompatible nulling characteristics.

Inclusion of several null positions in the present invention allows simplificaton or suppression of an initial centering by providing alternate reference positions distributed within the range of possible initial orientations of the mirror associated with the system under consideration. There is no requirement for a large number of such nulls, or for their equal spacing. In fact their spacing does not need to follow any exact pattern, it does not even need to be known. In FIG. 10 the spacing of the nulls is purposely chosen randomly so as to emphasize this freedom.

Rotations of a mirror around two orthogonal axii parallel to its plane can be monitored simultaneously with a simple adaptation of the present invention in which a single, twin axii optical null system is used. In this implementation of the invention the following changes are made: the focal plane of the objective is divided in four quadrants with their common point on the optical axis of the objective; the light sensors and the light emitting component corresponding to our rotation axis use two opposed quadrants with respect to the focal point; the other two quadrants are dedicated in a similar way to the control of rotation with respect to the other axis.

The apparatus of the invention, due to its small size, low power, long term stability is ideally suited to environmental and geophysical applications. In addition to a magnetic variograph described earlier it can be used to monitor other parameters when used in conjunction with appropriate transducers that convert their variations into rotations of a mirror. Such applications can include gravimeters, strainmeters, tiltmeters, temperature monitors and many others.

The pressure gauge referred to earlier is shown on the semiexploded view of FIG. 11. All components are the same as those of the magnetometer of FIG. 9 except for the suspension assembly 40. The latter is now replaced by a Bourdon tube assembly 49. A multiturn Bourdon tube 50, with vertical axis is attached to one of the end caps 48, with a pressure input tube 51 connected to it. A small metal finger 52 is welded to the other end of the Bourdon tube and an axial light rod 53 is attached to it. The axial rod 53 supports the magnet 45 and the mirror 1. The upper cap 48 has a hole 54 in its center, which can be either sealed out by a plug 55, or connected to the exterior by the tube 56. If the plug 55 is installed, the system measures the pressure between the inside of the housing and the pressure applied to the input tube 51. If the tube 56 is installed the instrument measures the pressure differential between the two tubes. Operation is similar to that of the magnetometer: rotations of the Bourdon tube due to pressure turn the mirror thus offsetting the null and generating, after amplification, a current into the coil and a magnetic field that twists back the Bourdon tube by interaction with the magnet. The coil current is a measure of the pressure difference between outside and inside of the Bourdon tube. It can be advantageous to fill the housing with a transparent liquid to damp the Bourdon tube vibrations.

We have discussed earlier the advantages gained with respect to wide range at no loss of sensitivity and to relaxation of criticality in the initial setup when a multinull arrangement is used in place of a single one. FIG. 12 illustrates the simple manner in which one can modify the general assembly of the single null system on FIG. 7 to achieve a plurality of null positions.

Figure 8:
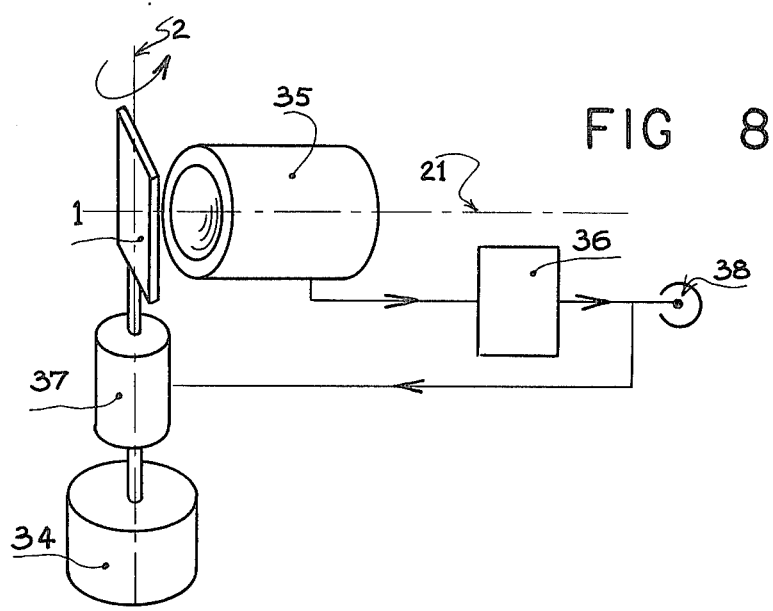
FIG. 8 is a basic and general schematic diagram summarizing the mode of utilization of the optical null detector in measuring, monitoring or controlling instruments or systems.

We have also shown above that a multinull system locks on one of the null positions when the instrument is first turned on and will saturate in case of variations of the monitored parameter that become larger than the range allowed by the amplifier. FIG. 13 illustrates a scheme by which the instrument with multinull feedback capability can automatically be induced to switch to a new null position when approaching saturation. The system of FIG. 8 is modified as follows: a switch 57, normally closed, is inserted in the power supply 58 of the light source. When solenoid 59 is actuated by the discriminator 60, as the latter senses an output of the system with absolute value in excess of a voltage e, itself slightly less than the saturation voltage, the solenoid 59 opens the switch 57; this turns the power to the light source off, suppressing the feedback and allowing the transducer to assume equilibrium position. As the servomechanism voltage drops to zero following turning off of the light, the discriminator action ceases and the switch 57 closes while the operation of the system is resumed, allowing the selection of a new closer, and more favorable, null position. The only requirement for this scheme to operate is that the spacing between any one of the adjacent nulls be smaller than the range covered within one null position (otherwise the system would return to the same null position, and would keep trying to shift indefinitely). Operability of this system has been tested.

FIG. 14 illustrates one of the many ways in which the discriminating circuitry can be assembled. The reference voltage e (see above) is represented by the two reference batteries 61 and 62. The output signal of the servomechanism 38 is applied to the input 63 of the discriminator, and to the two operational amplifiers 64 and 65. If the signal on 63 is larger than +e the output of 64 shifts from negative to positive; if the signal on 63 is smaller than -e the output of 65 also shifts from negative to positive. In both cases the positive signal opens transistor 66, which actuates solenoid 59 and opens switch 57. The other symbols in FIG. 14 are 67, 68 which are diodes isolating from each other the positive and negative discrimination functions and 69 that represents "ground".

Figure 15A:
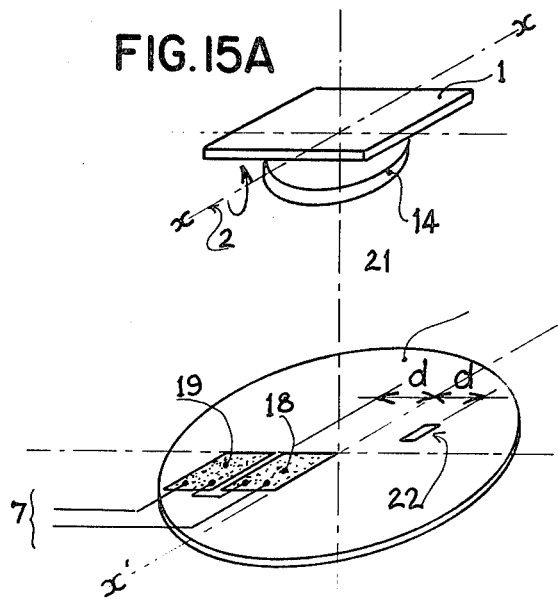
FIG. 15 illustrates how the basic optical null detector sensitive to rotations around a single axis is readily adaptable to the sensing of rotations about two mutually perpendicular rotation axii.
Figure 15B:
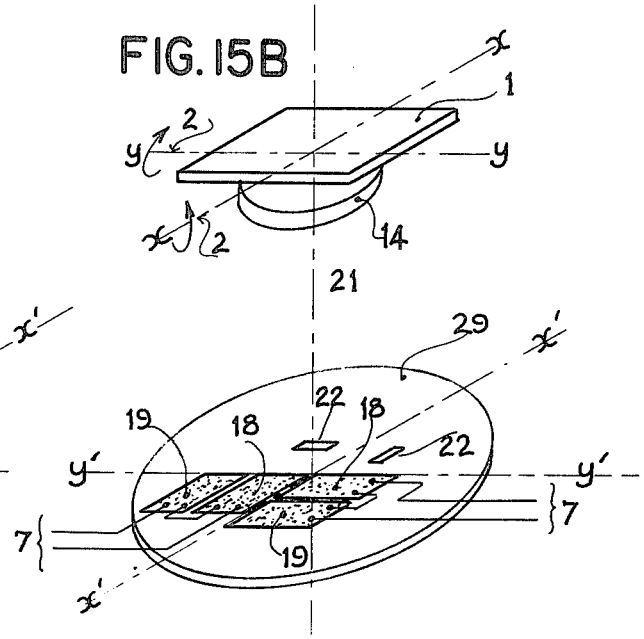

We have indicated earlier how the single axis optical null system of the invention can be adapted readily to the simultaneous sensing of rotations about two axii at right angles to each other. For this purpose two sets of light source and photosensor pairs are installed onto the mounting plate 29 (see FIG. 7) the configuration of the second set being the same as that of the first set, except for a 90° degree rotation. In order that each set of light sensors does not overlay each other, and be restricted to their own quadrant pair, as indicated earlier, it is necessary to move them an appropriate distance away from the optical center. There is an alternate rearrangement which makes space utilization on the mounting plate 29 more effective. FIG. 15 illustrates this feature in greater detail. In the single axis system of FIG. 15a, the mirror 1 rotates around the axis 2. A slight modification of the arrangement of light source and light sensors used in FIG. 7 has been made in FIG. 15a by translating the light source to the right, in a direction parallel to y'y', a distance d from x'x', and translating the light sensors the same distance d to the left. In this way light source and light sensors occupy only two opposed quadrants of the mounting plate, making the other two quadrants available. Since the new position of the light sensors gap remains symmetric with respect to the optical axis of the new position of the light source, the operation of the nulling system is unchanged. The two quadrants of the mounting plate now available can be used to assemble an additional set of light source and light sensors capable of sensing rotations around the axis yy, normal to the first sensing axis xx, (see FIG. 15b).

Figure 16A:
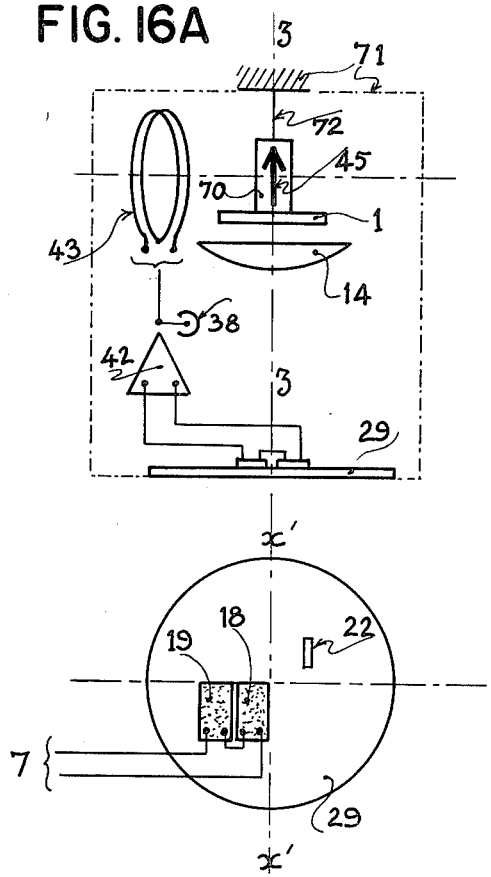
FIG. 16 illustrates the principles of a two axii tilt meter constructed according to the principles of the invention.

Optical sensors of mirror rotations operating simultaneously with respect to two rotation axii have been used in applied sciences for monitoring two independent parameters at a time such as the two sound channels of stereophonic systems, or the two components of a vector quantity. FIG. 16 illustrates the usefulness of the optical null of the invention in monitoring tilt with respect to its two distinct components. In FIG. 16a a single axis tiltmeter is shown, using the arrangement of FIG. 15a so as to show more readily the straightforwardness of adaptation from one sensing axis to two sensing axii. If a single axis tiltmeter is constructed, the arrangement of FIG. 7 is of course perfectly adequate. The tiltmeter transducer is constituted as follows. A small mass 70 is hanging from the top of the instrument support 71 to which it is attached by means of a fine and flexible fiber 72 which acts on a frictionless articulation between mass 70 and support 71. Such a system is classically called a pendulum. A mirror 1, with its plane horizontal, is attached to the pendulum. An objective 14, with its optical axis vertical, thus normal to the mirror, faces the mirror. The mounting plate 29 is located in the focal plane of the objective, with all other components as in FIG. 15a. The servoaction on the pendulum is performed as follows. The imbalance signal is amplified by 42 and injected into the coil 43. The magnetic field resulting interacts with a small magnet with vertical magnetic moment 45, centered within the pendulum mass. The interacting torque swings the pendulum and reorients the mirror if the instrument is tilted around an axis parallel to xx.

Figure 16B:
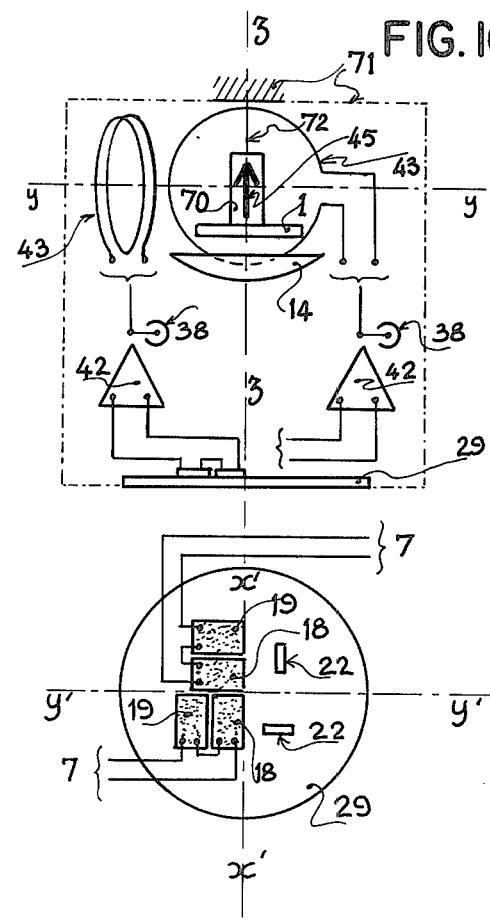

FIG. 16b illustrates a twin axii tiltmeter, similar in concept to the single axis unit of FIG. 16a. Two sets of light sources, sensor pairs, amplifiers, and coils are used, those of channel yy being arranged exactly as those of channel xx, except for a 90° rotation. A feasibility model of this, two axii tiltmeter has been assembled using a 10 gram pendulum, a 50 mm focal length objective, two LED's and two pairs of light sensors 5×10 mm each. Outside dimensions: 5 cm diameter, 12.5 cm high. Power supply: 14 mw, range $\pm 2 \times 10^{-2}$ radian; resolution $\pm 10^{-5}$ radian.

Various modifications of the invention, in addition to those shown and described herein will become apparent to those skilled in the art from the foregoing description and accompanying drawings.

I claim:

1. An optical null detector for detecting the sign of the angular departure from a reference position or null, as well as the size of this angular departure in the near vicinity of the reference position, of a flat mirror about an axis of rotation parallel to its plane, including in combination an objective located near and facing the mirror, with its optical axis normal to mirror when said mirror assumes reference or null position, a set of two rectangular light sensors with their active surfaces located in, or very nearly in the focal plane of the objective, on one side of and along a line crossing the optical axis and perpendicular to the axis of rotation of mirror, adjacent edges of said sensors being closely spaced and centered with respect to optical axis, said sensors being electrically connected to produce an output signal equal to the difference between the light flux that they individually intercept, a light source consisting of a small flat surface that radiates light from a small emitting area of said surface located in, the focal plane of the objective at a place opposite the narrow space between said light sensors with respect to the optical axis and at a distance from the optical axis less than the length of the adjacent edges of said light sensors, said emitting area slightly wider in its direction perpendicular to the direction of the adjacent edges of light sensors than the width of the inactive space between light sensors, said light source radiating light in a beam substantially directed toward said objective, said light beam reflected by mirror forming image of said emitting area overlapping equally said light sensors when mirror occupies null position.

2. An optical null detector in accordance claim 1 wherein a small positive meniscus lens is located very closely to the emitting area of the light source to reduce the solid angle of the incident light beam.

3. An optical null detector in accordance with claim 1 wherein a plurality of light sensor pairs are aligned in the focal plane of the objective on one side of and along a line crossing the optical axis and perpendicular to the axis of rotation of mirror, adjacent edges of said sensors being closely spaced, said sensors in each pair connected differentially so as to permit a plurality of positions of the mirror for which null signal is achieved.

4. An optical null detector in accordance with claim 2 wherein a plurality of light sensor pairs are aligned in the focal plane of the objective on one side of and along a line crossing the optical axis and perpendicular to the axis of rotation of mirror, adjacent edges of said sensors being closely spaced, said sensors in each pair connected differentially so as to permit a plurality of positions of the mirror for which null signal is achieved.

5. An optical null detector in accordance with claim 1 in which the light source is constituted by a light emitting diode, in which the light sensors are constituted by silicone photosensitive junctions popularly called solar cells and in combination with a housing having means to rigidly support objective, solar cells and said light emitting diode, said housing shielding its interior against external light except with respect to an opening adjacent to face of objective to allow passage of light to and from the mirror.

6. An optical null detector in accordance with claim 5 wherein a small positive meniscus lens is located very closely to the emitting area of the light source to reduce the solid angle of the incident light beam.

7. An optical null detector in accordance with claim 5 wherein a plurality of light sensor pairs are aligned in the focal plane of the objective on one side of and along a line crossing the optical axis and perpendicular to the axis of rotation of mirror, adjacent edges of said sensors being closely spaced, said sensors in each pair connected differentially so as to permit a plurality of positions of the mirror for which null signal is achieved.

8. An optical null detector in accordance with claim 6 wherein a plurality of light sensor pairs are aligned in the focal plane of the objective on one side of and along a line crossing the optical axis and perpendicular to the axis of rotation of mirror, adjacent edges of said sensors being closely spaced, said sensors in each pair connected differentially so as to permit a plurality of positions of the mirror for which null signal is achieved.

9. An apparatus for monitoring a variable parameter including an indicating element rotating in response to variations of this parameter a mirror attached to said indicating element, its plane parallel to the rotation axis of said indicating element an objective located near the mirror, facing it, and having its optical axis normal to the mirror when said mirror occupies reference or null position a set of two rectangular light sensors with their active surfaces located in, or very nearly in the focal plane of the objective, on one side of and along a line crossing the optical axis and perpendicular to the axis of rotation of mirror, adjacent edges of said sensors being closely spaced and centered with respect to optical axis, said sensors being electrically connected to produce an output signal equal to the difference between the light flux that they individually intercept a light source consisting of a small flat surface that radiates light from a small emitting area of said surface located in, the focal plane of the objective at a place opposite the narrow space between said light sensors with respect to the optical axis and at a distance from the optical axis less than the length of the adjacent edges of said light sensors, said emitting area slightly wider in its direction perpendicular to the direction of the adjacent edges of light sensors than the width of the inactive space between light sensors, said light source radiating light in a beam substantially directed toward said objective, said light beam reflected by mirror forming image of said emitting area overlapping equally said light sensors when mirror occupies null position a feedback means responding to the output signal from the light sensors in producing an action upon the rotating indicating element urging said indicating element toward a position wherein the output signal of the light sensors is zero, said action from said feedback means being in one direction for one polarity of the light sensor output and in opposite direction for the other polarity and a means for recording the size of the feedback action as indicative of the value of the parameter being monitored.

10. An apparatus according to claim 9 wherein said feedback action is obtained by means of a magnet mechanically coupled to said indicating element and a coil producing a magnetic field exerting a torque on said magnet, said magnetic field and said torque proportional to coil current, said current controlled by said light sensors.

11. A magnetic variograph for monitoring variations of earth's magnetic field in a given direction comprising a magnet suspended on a fine wire with its magnetic moment oriented at right angle with direction of magnetic variations to be monitored a mirror attached to magnet, its plane parallel to suspension wire, rotating with said magnet under variations in torque impressed on said magnet by variations in magnetic field an objective located near the mirror, facing it and having its optical axis normal to the mirror when said mirror occupies reference or null position, a set of two solar cells with active surfaces located in, or very nearly in the focal plane of the objective on one side of a line crossing the optical axis and perpendicular to the axis of rotation of the mirror, said sensors being electrically connected so as to produce an output signal proportional to the difference between the light fluxes that they individually intercept a light emitting component constituted by at least one light emitting diode consisting of a small flat surface that radiates light from a small emitting area of said surface located in the focal plane of the objective, on the side opposite to the solar cells, said light emitting diode radiating visible or invisible light principally in a direction toward objective, image of light emitting areas of said light emitting diode produced by objective and mirror focusing upon the adjacent edges of the solar cells, casting equal amount of light on each cell at some position of mirror taken as reference or null position, said image overlapping slightly the inactive space between said solar cells a coil with axis substantially normal to magnetic moment of said magnet when said magnet lies near the center of the range of its positions and also perpendicular to suspension an electronic circuit controlled by said solar cell output producing a current in said coil that generates a magnetic field urging said magnet to return mirror to null or reference position and a means to record current in coil as a measure of magnetic field required to maintain magnet in fixed position, thus also a measure of variations of magnetic field to be monitored.

12. An apparatus for monitoring a variable parameter according to claim 9 for monitoring variations of earth's field in a given direction wherein the indicating element is a magnet suspended on a fine wire with its magnetic moment oriented at right angle with direction of magnetic variations to be monitored.

13. An apparatus for monitoring a variable parameter according to claim 9 in which the light source is constituted by a light emitting diode and the light sensors are silicone photosensitive junctions.

14. An apparatus for monitoring a variable parameter according to claim 10 in which the light source is constituted by a light emitting diode and the light sensors are silicone photosensitive junctions.

15. An apparatus for monitoring a variable parameter according to claim 9 wherein a plurality of light sensor pairs are aligned in the focal plane of the objective on one side of and along the line crossing the optical axis and perpendicular to the axis of rotation of mirror, adjacent edges of said sensors being closely spaced, said sensors in each pair connected differentially so as to permit a plurality of positions of the mirror for which null signal is achieved.

16. An apparatus for monitoring a variable parameter according to claim 10 wherein a plurality of light sensor pairs are aligned in the focal plane of the objective on one side of and along the line crossing the optical axis and perpendicular to the axis of rotation of mirror, adjacent edges of said sensors being closely spaced, said sensors in each pair connected differentially so as to permit a plurality of positions of the mirror for which null signal is achieved.

17. A magnetic variograph according to claim 12 wherein a plurality of light sensor pairs are aligned in the focal plane of the objective on one side of and along the line crossing the optical axis and perpendicular to the axis of rotation of mirror, adjacent edges of said sensors being closely spaced, said sensors in each pair connected differentially so as to permit a plurality of positions of the mirror for which null signal is achieved.

18. An apparatus for monitoring a variable parameter according to claim 10 for monitoring pressure variations of fluid or gas wherein the indicating element is a Bourdon tube.

19. An apparatus for monitoring a variable parameter according to claim 10 for monitoring pressure variations of fluid or gas wherein the indicating element is a Bourdon tube.

20. A pressure sensor according to claim 19 wherein a plurality of light sensor pairs are aligned in the focal plane of the objective on one side of and along the line crossing the optical axis and perpendicular to the axis of rotation of mirror, adjacent edges of said sensors being closely spaced, said sensors in each pair connected differentially so as to permit a plurality of positions of the mirror for which null signal is achieved.

21. A pressure sensor for monitoring pressure variations of fluid or gas comprising a Bourdon tube submitted to the pressure to be monitored a magnet attached to said Bourdon tube, with its magnetic moment perpendicular to axis of said Bourdon tube a mirror mechanically connected to Bourdon tube, its plane parallel to said Bourdon tube axis and rotating in conjunction with rotations of Bourdon tube and magnet an objective located near the mirror, facing it and having its optical axis normal to mirror when said mirror occupies reference or null position p1 a set of two rectangular light sensors with their active surfaces located in, or very nearly in the focal plane of the objective, on one side of and along a line crossing the optical axis and perpendicular to the axis of rotation of mirror, adjacent edges of said sensors being closely spaced and centered with respect to optical axis, said sensors being electrically connected to produce an output signal equal to the difference between the light flux that they individually intercept a light source consisting of a samll flat surface that radiates light from a small emitting area of said surface located in, the focal plane of the objective at a place opposite the narrow space between said light sensors with respect to the optical axis and at a distance from the optical axis less than the length of the adjacent edges of said light sensors, said emitting area slightly wider in its direction perpendicular to the direction of the adjacent edges of light sensors than the width of the inactive space between light sensors, said light source radiating light in a beam substantially directed toward said objective, said light beam reflected by mirror forming image of said emitting area overlapping equally said light sensors when mirror occupies null position a coil with its axis normal to magnetic moment of magnet when magnet and mirror occupy null position and also prependicular to Bourdon tube axis an electronic circuit controlled by light sensor output producing a current in said coil that generates magnetic field urging magnet to return mirror to null or reference position and a means to record current in coil as a measure of the pressure to be monitored 22. A pressure sensor for monitoring pressure variations of fluid or gas according to claim 21 wherein a plurality of light sensor pairs are aligned in the focal plane of the objective on one side of and along the line crossing the optical axis and perpendicular to the axis of rotation of mirror, adjacent edges of said sensors being closely spaced, said sensors in each pair connected differentially so as to permit a plurality of positions of the mirror for which null signal is achieved.

23. A pressure sensor for monitoring pressure variations of fluid or gas according to claim 21 wherein the Bourdon tube is enclosed in a housing filled with transparent fluid to damp Bourdon tube vibrations.

24. An apparatus for monitoring a variable parameter in accordance with claim 16 in which the spacing between adjacent nulls is no larger than the spacing that corresponds to the range over which feedback remains operating and including in combination
- a voltage discriminator that continuously senses the signal produced by said apparatus as said variable parameter being monitored varies, said discriminator providing a signal when said output is larger than an upper preset value, or smaller than a lower preset value, preset values being near, but within the range over which feedback remains operating
- a means by which a switch is turned off for a short preset time upon occurence of said signal from said discriminator, said switch connected so as to interrupt feedback action when in off position, said interruption of feedback action allowing indicating element to move to natural equilibrium thus allowing said apparatus to restart operation from new null position closest to new natural equilibrium upon return to turned on position of said switch, thus upon subsequent resumption of feedback action.

25. An optical null detector for detecting the sign of the angular departure from a reference position or null, as well as the size of this angular departure in the near vicinity of the reference position, of a flat mirror about an axis of rotation parallel to its plane, including in combination
- an objective located near and facing the mirror, with its optical axis normal to mirror when said mirror assumes reference or null position,
- a set of two rectangular light sensors with their active surfaces located in, or very nearly in the focal plane of the objective, on one side of and along a line crossing the optical axis and perpendicular to the axis of rotation of mirror, adjacent edges of said sensors being closely spaced and centerline between adjacent edges being located at a distance d away from optical axis in a direction normal to the mirror rotation axis, said sensors being electrically connected to produce an output signal equal to the difference between the light flux that they individually intercept,
- a light source consisting of a small flat surface that radiates light from a small emitting area of said surface located in the focal plane of the objective at a place such that its center coincides with a point symetric of the center point of the gap formed by the adjacent edges of the light sensors with respect to the optical axis, that is at a distance d from said optical axis, but in a direction opposite from the light sensors gap,
- said emitting area slightly wider in its direction perpendicular to the direction of the adjacent edges of light sensors than the width of the inactive space between light sensors, said light source radiating light in a beam substantially directed toward said objective, said light beam reflected by mirror forming image of said emitting area overlapping equally said light sensors when mirror occupies null position.

26. An optical null detector in accordance with claim 25 in which a second identical set of light source and light sensors is also located in the focal plane of the objective, bearing the same geometric relationship with each other as the first set but rotated 90° around optical axis in such a way that second set of light source and light sensors provides second null position with respect to mirror rotations around second axis parallel to mirror and perpendicular to first rotation axis.

27. An apparatus for monitoring a variable parameter including an indicating element rotating in response to variations of this parameter
- a mirror attached to said indicating element, its plane parallel to the rotation axis of said indicating element
- an objective located near and facing the mirror, with its optical axis normal to mirror when said mirror assumes reference or null position,
- a set of two rectangular light sensors with their active surfaces located in, or very nearly in the focal plane of the objective, on one side of and along a line crossing the optical axis and perpendicular to the axis of rotation of mirror, adjacent edges of said sensors being closely spaced and centerline between adjacent edges being located at a distance d away from optical axis in a direction normal to the mirror rotation axis, said sensors being electrically connected to produce an output signal equal to the difference between the light flux that they individually intercept,
- a light source consisting of a small flat surface that radiates light from a small emitting area of said surface located in the focal plane of the objective at a place such that its center coincides with a point symetric of the center point of the gap formed by the adjacent edges of the light sensors with respect to the optical axis, that is at a distance d from said optical axis but in a direction opposite from the light sensors gap,
- said emitting area slightly wider in its direction perpendicular to the direction of the adjacent edges of light sensors than the width of the inactive space between light sensors, said light source radiating light in a beam substantially directed toward said objective, said light beam reflected by mirror forming image of said emitting area overlapping equally said light sensors when mirror occupies null position
- a feedback means responding to the output signal from the light sensors in producing an action upon the rotating indicating element urging said indicating element toward a position wherein the output signal of the light sensors is zero, said action from said feedback means being in one direction for one polarity of the light sensor output and in opposite direction for the other polarity and
- a means for recording the size of the feedback action as indicative of the value of the parameter being monitored.

28. An apparatus according to claim 27 wherein said feedback action is obtained by means of a magnet mechanically coupled to said indicating element and a coil producing a magnetic field exerting a torque on said magnet, said magnetic field and said torque proportional to coil current, said current controlled by said light sensors.

29. A monitoring apparatus according to claim 28 wherein a second identical set of light source and light sensors is also located in the focal plane of the objective, bearing the same geometric relationship with each other as the first set but rotated 90° around optical axis in such a way that second set of light source and light sensors provides second null position with respect to mirror rotations around second axis parallel to mirror and perpendicular to first rotation axis and in which a second coil at right angle with the first are used to produce action on the magnet attached to the indicating element that urges mirror to return to null position with respect to second rotation axis.

30. An apparatus for monitoring a variable parameter according to claim 10 to monitor variations of tilt with respect to a single axis wherein the indicating element is a small free hanging mass, classically called pendulum, attached to instrument frame, thus rotating with respect to frame when frame is tilted.

31. An apparatus for monitoring a variable parameter according to claim 29, to monitor tilt with respect to two axii normal to each other wherein the indicating element is a small free hanging mass, classically called pendulum, attached to instrument frame, thus rotating with respect to frame when frame is tilted.

* * * * *